(12) United States Patent
Matz et al.

(10) Patent No.: US 6,258,862 B1
(45) Date of Patent: *Jul. 10, 2001

(54) COMPOSITION BASED ON POLYOLEFINS AND ON ETHYLENE-VINYL ACETATE COPOLYMER

(75) Inventors: Pierre Matz, Brussels; Edmond Mulkens, Braine-l'Alleud, both of (BE)

(73) Assignee: Solvay (Société Anonyme), Brussels (BE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/881,610

(22) Filed: Jun. 25, 1997

(30) Foreign Application Priority Data

Jul. 2, 1996 (BE) .................................................. 09600602

(51) Int. Cl.⁷ ................................ C08J 9/06; C08L 23/16
(52) U.S. Cl. ................................ 521/81; 521/79; 521/134
(58) Field of Search .................................... 525/222, 240; 521/75, 74, 134, 59, 60, 62, 79, 80, 81

(56) References Cited

U.S. PATENT DOCUMENTS

| | | | |
|---|---|---|---|
| 4,212,787 | * 7/1980 | Matsuda et al. | 525/140 |
| 4,247,652 | * 1/1981 | Matsuda et al. | 525/140 |
| 5,110,842 | * 5/1992 | Uejikkoku | 525/227 |
| 5,387,620 | * 2/1995 | Park | 521/143 |
| 5,601,889 | * 2/1997 | Chundury | 525/222 |
| 5,639,818 | * 6/1997 | Lee | 525/222 |

\* cited by examiner

*Primary Examiner*—Morton Foelak
(74) *Attorney, Agent, or Firm*—Venable; Marina V. Schneller

(57) ABSTRACT

A composition including, by weight:
  from 40 to 80% of at least one uncrosslinked composition (A) including at least one polyolefin (PA);
  from 60 to 20% of at least one crosslinked composition (B) including at least one propylene polymer (PB) and at least one ethylene-vinyl acetate (EVA) copolymer.

The composition B has preferably been obtained beforehand by processing a composition including from 10 to 49% of at least one propylene polymer (PB), from 90 to 51% by weight of at least one ethylene-vinyl acetate copolymer, and from 100 to 1500 ppm by weight of at least one crosslinking agent.

This composition makes it possible especially to manufacture foam sheets which can be employed in the motor vehicle industry, which are thermoformable, HF weldable and recyclable.

10 Claims, No Drawings

COMPOSITION BASED ON POLYOLEFINS AND ON ETHYLENE-VINYL ACETATE COPOLYMER

FIELD OF THE INVENTION

The present invention relates to compositions based on polyolefins and on ethylene-vinyl acetate (EVA) copolymer, which are found to be advantageous especially for manufacturing sheets that can be employed in the motor vehicle industry, and in particular foam sheets. It also relates to the articles manufactured from these compositions and to a process for manufacturing them.

TECHNOLOGY REVIEW

For many years the market for the internal trim of motor vehicles has been dominated by the use of PVC sheets, either in combination with ABS for the dashboards, or highly plasticized for the door trims and the manufacture of sun visors.

Although the properties of these materials are advantageous, there are nevertheless some disadvantages in employing PVC in this application. Apart from those related to the use of plasticizers, such as "fogging" (evaporation of volatile constituents, in particular of plasticizers, and their deposition on the windows) or embrittlement with time, PVC is not compatible with the majority of the other polymers employed in the motor vehicle industry, and this requires its separation from the other motor vehicle components before it may be recycled.

There is therefore a requirement in the motor vehicle industry for a new material combining the good intrinsic properties of plasticized PVC (high and low temperature behaviour, thermoformability, high-frequency weldability, flexibility, etc.) with the possibility of being easily recycled, especially by direct thermal recycling or by reemploying it with other polymers employed in motor vehicles.

The proposed compositions ought not only to ensure excellent mechanical and stability properties in the products which result therefrom, but ought also to be high-frequency weldable with a view to being usable in the envisaged application. In addition, it is appropriate that the rheology of these compositions should be such as to permit high quality thermoforming—and in particular graining.

Various compositions based on polyolefins, in particular on a propylene homopolymer or copolymer, on ethylene-vinyl acetate copolymer and optionally on peroxide used as crosslinking agent during the processing, have already been proposed.

Document WO-93/24568 mentions compositions which make it possible to obtain, especially by extrusion, high-frequency weldable products for various applications in the medical field, such as pouches, bags, tubes and closures. The polymer composition used contains at least one ethylene-vinyl acetate copolymer, at least one propylene polymer, approximately 0.01% to 5% by weight of a crosslinking agent and approximately 0.1% to 35% by weight of one or several other polymers.

The sheets initially obtained from these compositions are, however, difficult to thermoform.

SUMMARY OF THE INVENTION

The invention aims to provide high-frequency weldable compositions which can especially advantageously replace PVC in motor vehicle internal trim applications without entailing prohibitive costs.

These compositions must meet the usual criteria in this area of application, especially insofar as grainability, behaviour towards heat and towards UV, mattness and fire resistance are concerned, while being recyclable. In particular, they must be thermoformable and must, for this purpose, exhibit a suitable rheology.

They must additionally be suitable for the manufacture of articles in the form of foams, in particular sheets, and this requires very specific—especially rheological—properties. It has already been proposed to manufacture foams from compositions containing a crosslinking agent. However, in such a case a high degree of crosslinking is generally necessary to obtain satisfactory rheological properties, and this is extremely awkward in view of the recycling: in effect, a high degree of crosslinking results in the formation of gels, and this considerably perturbs the recycling.

In addition, during the manufacture of crosslinked foams, the crosslinking generally takes place after the extrusion, making this manufacture more complicated.

It is furthermore desirable to develop compositions that can be employed in the manufacture of multilayer sheets of the sheet/foam type, such as those commonly employed in motor vehicle internal trim. A common model of such multilayer sheet includes a surface sheet based on thermoplastic polyolefins and a foam based on plasticized PVC; it is clear that the recycling of such sheets presents serious problems and, in the majority of cases, requires complex systems for separating the materials.

DETAILED DESCRIPTION OF THE INVENTION

Consequently, the present invention relates to a composition including, by weight:
from 40 to 80% of at least one uncrosslinked composition (A) including at least one polyolefin (PA);
from 60 to 20% of at least one crosslinked composition (B) including at least one propylene polymer (PB) and at least one ethylene-vinyl acetate (EVA) copolymer.

In particular, good results have been obtained by employing a crosslinked composition (B) including, by weight, at least 10%, preferably at least 20%, of at least one propylene polymer (PB), the quantity of which is not more than 49%, preferably not more than 40%.

Besides propylene, the propylene polymer (PB) may optionally contain one or several other monomers preferably chosen from alpha-olefins; it may equally well be a homopolymer or a random or a block copolymer, a terpolymer and the like. The propylene polymer (PB) advantageously includes at least 50% by weight of propylene. It preferably includes at least 75% by weight of propylene. It is particularly preferably a propylene homopolymer. Its melt index (MFI) (230° C.; 2.16 kg; measured according to ISO standard 1133–1991 version) is advantageously lower than 10 g/10 min and preferably lower than 4 g/10 min. It is furthermore advantageously at least 0.1 g/10 min, preferably at least 0.4 g/10 min.

It is preferred that the crosslinked composition (B) should have been prepared beforehand by processing at least one propylene polymer (PB), at least one EVA copolymer, and from 100 to 1500 ppm by weight of at least one crosslinking agent.

The crosslinked composition (B) advantageously additionally includes, by weight, at least 51%, preferably at least 60%, of at least one ethylene-vinyl acetate (EVA) copolymer in a quantity of not more than 90%, preferably not more than 80%. The weight content of this vinyl acetate copolymer is generally at least 12%, preferably at least 18%, while being not more than 40%, preferably not more than 32%.

It is furthermore advantageous that the total vinyl acetate content of the composition (B) should be at least 12%, preferably at least 15%, and not more than 25%, preferably not more than 22%, relative to the total weight of the propylene polymer (PB) and of the PVA copolymer.

An MFI value (190° C.; 2.16 kg; also measured according to ISO standard 1133) higher than 0.5 g/10 min, and very particularly higher than 1.5 g/10 min, is preferred in the case of the EVA copolymer. This value is advantageously lower than 25 g/10 min, preferably lower than 9 g/10 min.

According to an advantageous alternative form of the invention the melt indices of the propylene polymer ($MFI_{PB}$) and of the EVA copolymer ($MFI_{EVA}$) (measured in the abovementioned respective conditions and expressed in g/10 min) should correspond to the relationship $$\frac{MFI_{PB} \cdot P_{PB}}{MFI_{EVA} \cdot P_{EVA}} < 1, \text{ and preferably } \frac{MFI_{PB} \cdot P_{PB}}{MFI_{EVA} \cdot P_{EVA}} < 0.7$$

in which $P_{PB}$ and $P_{EVA}$ denote the respective weight proportions of these constituents PB and EVA ($P_{PB}+P_{EVA}=1$).

To bring about the crosslinking of the composition (B) during its preparation a crosslinking agent is employed, the quantity of which is generally less than 1500 ppm (parts by weight per million), preferably less than 900 ppm, particularly preferably less than 700 ppm. Its quantity is furthermore generally more than 100 ppm, preferably more than 200 ppm. These very small quantities make it possible to produce a limited crosslinking of the composition B, which is advantageous in the context of the present invention.

The contents of the propylene polymer (PB), of the EVA copolymer and of the crosslinking agent are expressed by weight relative to 100% of the propylene polymer (PB) and of the EVA copolymer.

According to another advantageous alternative form of the invention, the composition B includes, by weight, 10 to 49% of at least one propylene polymer and 90 to 51% of at least one ethylene-vinyl acetate copolymer whose vinyl acetate content is at least 12 and not more than 40% by weight, and is characterized both by a ratio $\mu_{0.25}/\mu_{100}$ (these parameters denoting the shear viscosity, measured with a rheogoniometer at 170° C., at 0.25 s$^{-1}$ and 100 s$^{-1}$ respectively) higher than 25 and by a ratio $\mu_{maxF}/\mu_{0.2s}$ (these parameters denoting, respectively, the elongational viscosity at which the tensile force exerted on the sample is at a maximum, and that measured after 0.2 s of traction, at 170° C. in each case) higher than 5.

The decomposition temperature (scorch temperature) of the crosslinking agent is preferably higher than the melting temperature of the EVA copolymer. The concentration of the crosslinking agent is based on a percentage of active oxygen of 10% by weight; a rule of three will be applied in the case of different concentrations.

The crosslinking agent advantageously consists essentially of at least one organic peroxide which is preferably chosen from 2,5-dimethyl-2,5-di(tert-butyl-peroxy) hexane (DHBP), dicumyl peroxide (DCUP), tert-butyl cumyl peroxide (BCUP), di-tert-butyl peroxide (DTBP), 2,5-dimethyl-2,5-di(tert-butylperoxy)-3-hexyne (DYBP) or 1,3-di(2-tert-butylperoxyisopropyl)benzene (DIPP).

The quantity of crosslinking agent which is shown relates to the assumption of its complete use during the preparation of the crosslinked composition (B); in most cases the crosslinking agent reacts entirely during this preparation, with the result that the composition (B) is free from it at the end of its preparation.

If some of the polymeric constituents of the composition (B) contain additives which reduce the effect of the crosslinking agent, such as antioxidants, or if the operating conditions are such that this agent cannot react completely, in particular when the duration of the preparation of the crosslinked composition (B) (for example the residence time in the extruder, if an extruder is employed) is shorter than the time needed for its complete reaction, the said quantities of the crosslinking agent will need to be adapted for the active content of crosslinking agent to be sufficient. Adding antioxidants to the constituents employed is preferably to be avoided.

The crosslinking agent may be added as such to the propylene polymer (PB) and to the EVA copolymer, or may be mixed with them in the form of a master mix consisting of this agent and of a compatible carrier. In particular, the crosslinking agent may be used on a carrier essentially consisting of polyethylene. The optional carrier for the crosslinking agent preferably does not represent more than 5% of the total weight of the propylene polymer (PB) and of the EVA copolymer.

The crosslinked composition (B) may advantageously be prepared by a process of reactive extrusion of its constituents. Good results have been obtained by avoiding producing a premix of the constituents of the composition of the invention in the molten state (compounding), that is to say by performing the processing in a single stage.

In the operating conditions of the reactive extrusion in the case of compositions of this type it would seem—without this interpretation being capable of implying any limitations—that the macroradicals of the two polymers (EVA—PB) can react together. Long-branched EVA—PB copolymers would then be formed. This type of copolymers is ideal for compatibilizing two incompatible polymers. Furthermore, EVA branches on other EVAs and a partial depolymerization of the propylene polymer (PB) would be formed.

The formation of long branching is highly advantageous for the applications where the article obtained by making use of the composition of the invention is to be thermoformed. This branching entails an improvement in the viscoelastic properties at low shear rate (melt strength and thermoformability) without increasing the viscosity at high rate, as would happen in a polymer or a mixture of polymers of linear structure and higher molecular weight. The extrudability is thus ensured. Besides the property of high melt strength, these branches contribute strain hardening which is due to the entanglements formed between the macromolecules. This property enables the thickness to be kept uniform when a sheet is thermoformed. The formation of regions that are significantly more drawn than others is thus avoided.

The composition of the invention preferably includes at least 25% by weight of the crosslinked composition (B). Furthermore, it advantageously contains not more than 40% thereof.

The uncrosslinked composition (A) preferably includes at least 50% by weight of one or more polyolefins (PA). The polyolefin (PA) is any polymer including at least 50% by weight one or more olefins—preferably propylene—as well as optionally one or several other minor comonomers. The polyolefin (PA) is preferably of low viscosity, that is to say that its melt index (measured according to ISO standard 1133–1991 version) is at least 3 g/10 min (230° C., 2.16 kg conditions). It is furthermore advantageously of low elasticity.

If it is desired to improve the high-frequency (HF) weldability of the articles manufactured from the compositions described above, it is desirable that the composition (A) should include at least one polar polymer such as, for example, a copolymer or terpolymer of ethylene with one or several polar monomers, preferably an EVA copolymer. To this end, according to a preferred alternative form, the uncrosslinked composition (A) includes at least one polyolefin (PA) and at least one EVA copolymer. Particularly preferably from 10 to 49% by weight of polyolefin(s) (PA) and from 51 to 90% by weight of EVA copolymer(s) are employed. When one or more EVA copolymers are employed in the composition (A), it is advantageous that the weight content of vinyl acetate in this composition should be from 12 to 40% relative to the total weight of the composition (A). According to a particularly preferred alternative form, with the exception of one or several crosslinking agents, the composition (A) includes the same ingredients as the composition (B), this being approximately in the same proportions (to within 5%); this alternative form is highly advantageous from the viewpoint of the recycling of the compositions of the invention. When the uncrosslinked composition (A) includes at least one polyolefin (PA) and at least one EVA copolymer, it is preferred that these polymers should have melt indices as defined above with reference to the crosslinked composition (B).

Besides the essential constituents indicated above, the abovementioned compositions A and/or B may further optionally include one or several known additives and/or fillers which do not entail an increase in the weight or the volume of the formulation by more than 25% (relative to the weight or the volume of the composition concerned). Examples of additives which may be mentioned are flame retardants, UV stabilizers, lubricants and pigments. Examples of fillers which may be mentioned are calcium carbonate, barium sulphate, fibres of cellulose based materials, glass fibres and the like.

The present invention also relates to the articles manufactured from a composition as defined above.

These articles exhibit all the properties which are required in view of the abovementioned applications, where the flexibility, easy thermoformability, high-frequency weldability, fire behaviour and excellent high and low temperature properties are concerned. These articles are easily recyclable because the polymers employed exhibit a good compatibility with the other polymers generally employed in the motor vehicle industry.

The invention also relates to an article as described above, which is in the form of a foam, in particular of a foam exhibiting a relative density of between 0.05 and 0.5. Lastly, it preferably relates to a foam sheet manufactured from a composition as described above. A "sheet" is intended to denote an article of a substantially uniform thickness which is low in relation to its other dimensions (thickness generally of the order of magnitude of a millimetre). To manufacture these foam sheets it is convenient to employ an extruder fitted with a flat die. Such sheets can be advantageously laminated together with one or several other sheets of any kind, regardless of whether this done in line after their extrusion or subsequently to their production.

Any known technique can be employed for manufacturing a foam from the composition of the invention, for example the injection of gases such as nitrogen, $CO_2$, alkanes (propane, butane, pentane, etc.) or some fluorinated gases (HCFC, HFC, and the like) into the composition in the molten state when it is being processed (for example in the extruder), or else the incorporation into the composition, before or during its processing, of one or more additives capable of releasing gases when the said composition is processed. In particular it is possible to incorporate into it, before or during its processing, one or more blowing agents such as azodicarbonamide or one of its derivatives, OBSH, TSS, sodium bicarbonate, citric acid, and the like, preferably in quantities from 1 to 20% by weight relative to the quantity of the polymers. It is also possible to incorporate into it, before or while it is processed, one or more nucleating agents such as calcium carbonate or talc, preferably in quantities of 0.1 to 10% by weight relative to the quantity of the polymers.

The foams manufactured by means of the compositions of the invention can advantageously be employed for manufacturing multilayer articles including a layer of such a foam and a surface sheet. This surface sheet is preferably manufactured in the same way as the crosslinked compositions (B) are prepared; in a particularly preferred manner the surface sheet includes the same ingredients as the foam composition (B). It is advantageous that these ingredients should be present in approximately the same proportions (to within 5%) as in the composition B; this alternative form is extremely advantageous from the viewpoint of the recycling of these multilayer articles.

One of the advantages of the invention is that the compositions which form its subject-matter are at the same time suited for the manufacture of foams and of sheets, as well as, consequently, of multilayer articles including such foams and such sheets. These articles can be recycled very easily because of the great chemical similarity of their various constituents (surface sheet, foam composition (A), foam composition (B)) and of the generally limited degree of crosslinking of the crosslinked constituents.

The compositions of the invention can especially be employed for manufacturing sheets for the internal trim of land vehicles, sea vessels or aircraft, for example for the trim of dashboards, doors, internal walls and the like. To this end, another subject-matter of the invention relates to the use of the compositions described above for manufacturing articles, and in particular sheets, intended for the internal trim of vehicles.

Insofar as the preparation of the composition of the invention described above is concerned, it will be noted that the optional different constituents of the composition A need not necessarily have been melted and mixed beforehand, for example by means of an extruder, and then resolidified; it is entirely possible to mix the various constituents of the composition A with the crosslinked composition B prepared beforehand, before melting the whole and converting it into a finished article such as, for example, a sheet.

More particularly, the invention also relates to a process for the manufacture of an article in the form of a foam as described above, in which:

the mixture of the compositions A and B is melted while being kept under pressure, at least one gas under pressure is injected into it, the mixture A/B containing the gas is extruded in conditions such as to cause the expansion of the extruded mixture.

In contrast to the conventional processes for the manufacture of partially crosslinked foams, no crosslinking—in particular no reactive extrusion stage—is involved here (the crosslinking has taken place beforehand, during the preparation of the crosslinked composition (B)), which is advantageous from an industrial viewpoint.

The extrusion conditions are preferably the following: the temperatures of the various sections of the extruder are adjusted according to a bell-shaped profile, with a maximum temperature approximately where the gas is injected. An extruder fitted with a flat die can especially be employed. It is further possible to employ a circular multilayer die, the outer layer(s) being free from blowing agent in this case; it then suffices to slit the sleeve obtained to convert it into a sheet.

EXAMPLES

The following examples illustrate the invention and its advantages without any limitation being implied. Example 1 is in accordance with the invention and Example 2R is given by way of comparison.

All the proportions are by weight.

Example 1

A mixture of the following is compounded by means of a Clextral® BC 21 twin-screw extruder:

70% of EVA (ethylene-vinyl acetate copolymer) of Escorene® UL00328 type in granule form, 30% of Solvay Eltex® P RF 110 PP in fluff form, and as crosslinking agent, 1 phr (that is to say 1% relative to the total weight of the EVA (ethylene-vinyl acetate copolymer) and of the PP) of a master mix including 500 ppm of DHBP adsorbed on polyethylene fluff.

Note: in the above-described composition, the component designated ESCORENE® UL0028 is an EVA polymer; HIFAX® CA 10A is a polypropylene copolymer with high rubber content. ELTEX® PRF 110 is a copolymer.

A die with holes which is placed at the outlet of the extruder (die temperature≈220° C.) makes it possible to form laces which are chopped to produce granules.

The extruder rotates at 300 rev/min and the total throughput is 10 kg/h. The mean residence time in the extruder is estimated at approximately 25 s.

These granules of crosslinked composition (B) are mixed with the following ingredients (forming the composition A):

70% of the same EVA (ethylene-vinyl acetate copolymer) as above,

30% of Hifax® CA10A PP, and 2 phr of a master mix consisting of 90% of polypropylene and 10% of talc.

The weight ratio of the mixture A:B was 70:30.

The mixture thus obtained is introduced into another extruder, where it is melted and homogenized. In addition, nitrogen is injected under pressure into the molten mixture A/B without preliminary heating and at a flow rate adjusted as a function of the desired foam density: the gas dissolves in this mixture, the temperature of which is lowered uniformly towards the extruder delivery (from the feed hopper, the temperature profile of the extruder increases firstly from 170 to 220° C., to return to 170° C. at the die).

The plastic is then extruded in the form of a sheet in an annular die whose geometry and temperature conditioning are judiciously chosen (its geometry being especially suited to produce a maximum pressure drop near. the die exit, and the heat conditioning being very precise and uniform) according to the desired properties of the foam (especially its surface appearance). The sheet thus extruded expands as soon as it leaves the die.

Foams exhibiting a relative density of 0.2 to 0.5 and a flexibility lower than 35D Shore were thus produced.

Comparative Example 2R—Absence of Crosslinked Composition

If the above example is repeated in the absence of crosslinked composition (B), foam sheets of low density and of homogeneous structure (that is to say exhibiting cells of similar sizes) cannot successfully be obtained. The surface appearance and the properties (especially the drawability) of these foam sheets makes them unusable in particular in the motor vehicle industry.

What is claimed is:

1. A process for the manufacture of an article in the form of a foam from a composition comprising
   (A) from 40 to 80% by weight of at least one uncrosslinked composition comprising at least one polyolefin; and
   (B) from 60 to 20% by weight of at least one crosslinked composition comprising at least one propylene polymer and at least one ethylene-vinyl acetate copolymer (EVA);
   wherein the process comprises
   melting the composition comprising (A) and (B), under pressure; injecting into said composition, comprising (A) and (B), at least one gas under pressure; extruding the gas injected composition comprising (A) and (B) containing the gas and allowing expansion of the extruded mixtures.

2. The process according to claim 1, in which the crosslinked composition (B) includes (by weight) from 10 to 49% of at least one propylene polymer and from 90 to 51% by weight of at least one ethylene-vinyl acetate copolymer.

3. The process according to claim 1, in which the propylene polymer (PB) employed in the crosslinked composition (B) exhibits a melt index (MFI) lower than 4 g/10 min.

4. The process according to claim 1, in which the crosslinked composition (B) has been prepared beforehand by processing at least one propylene polymer (PB), at least one EVA copolymer, and from 100 to 1500 ppm by weight of at least one crosslinking agent.

5. The process according to claim 1, in which the vinyl acetate weight content of the EVA copolymer of the crosslinked composition (B) is from 12 to 40% by weight.

6. The process according to claim 4, in which the crosslinking agent consists essentially of at least one organic peroxide.

7. The process according to claim 1, in which the uncrosslinked composition (A) includes at least one polyolefin (PA) and at least one EVA copolymer.

8. A foamed article manufactured using the process according to claim 1.

9. The foamed article according to claim 8, said foamed article being a sheet.

10. The process of claim 9, wherein said cross-linked composition is prepared before said melting.

\* \* \* \* \*